March 18, 1952     C. BELLUCCI     2,589,473
IMMERSION HEATER
Filed April 28, 1950
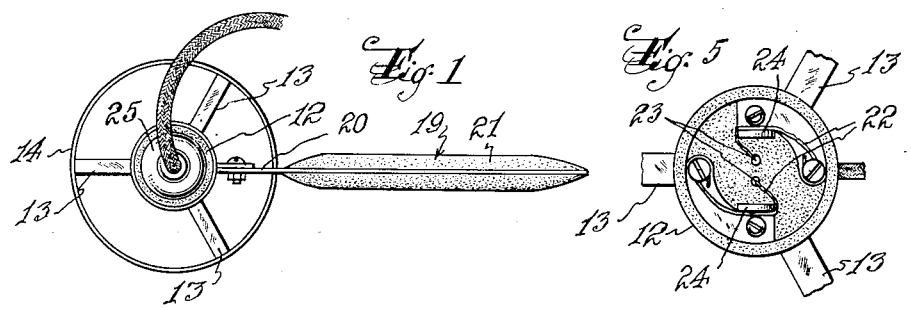
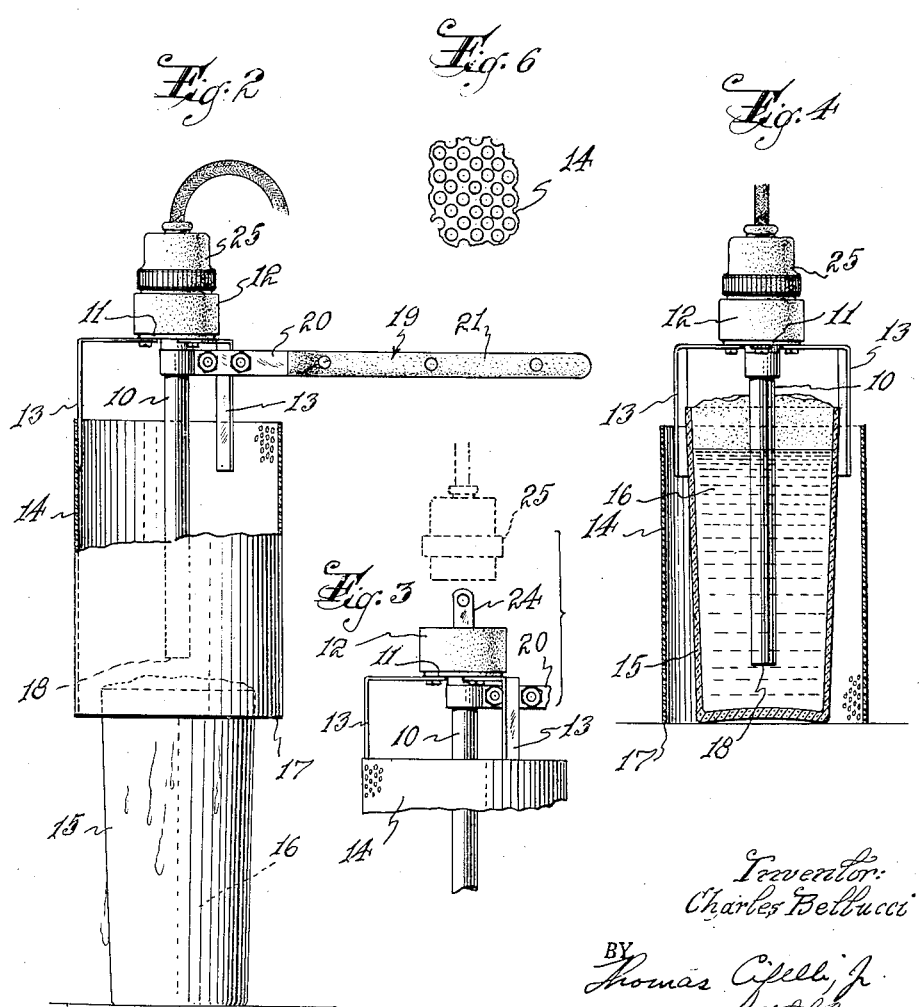

Patented Mar. 18, 1952

2,589,473

UNITED STATES PATENT OFFICE 2,589,473

IMMERSION HEATER

Charles Bellucci, Jersey City, N. J.

Application April 28, 1950, Serial No. 158,895

4 Claims. (Cl. 219—41)

This invention relates to immersion heaters suitable for heating liquids in open-top containers, the preferred embodiment of the drawings illustrating my novel heater as applied to warming a liquid such as beer.

An object of my invention is to provide an article of the type referred to which is simple in construction and quick, safe and efficient in operation. A particular object of the present invention is to furnish an immersion heater which is especially suitable for warming beer in glasses without danger of electrical shocks or burns to the user, and without causing the beer foam to run over the sides of the glass container.

The foregoing and other objects are accomplished by my novel immersion heater which comprises essentially electrical heating means associated with a handle having a heat-conducting portion in contact with the casing for the heating means and a non-heat-conducting portion, and a perforated, hollow cylindrical member, united with the casing and handle and surrounding the vessel in which the liquid to be heated is contained.

The following detailed description taken in connection with the accompanying drawings in which like numbers represent like parts throughout and which form a part hereof, is given to illustrate my invention.

In the drawings:

Fig. 1 is a top plan view of the heater shown attached to an electrical plug;

Fig. 2 is a side elevation in part vertical section showing the device of Fig. 1 over a vessel containing liquid (beer) to be heated;

Fig. 3 is a fragmentary exploded view showing the device forming this invention apart from the electrical plug which forms no part of this invention;

Fig. 4 is a part central vertical section of my device showing it in position over but not in contact with a vessel.

Fig. 5 is a top plan fragmentary view of my device, showing the electrical terminals thereof; and Fig. 6 is a fragmentary view of the hollow cylindrical member showing its perforations.

Referring to the drawings, the casing 10 contains an electrical heating element of suitable electrical characteristics suitably imbedded in mica or other suitable non-conducting material. Neither the heating element itself nor the mica is shown as they are of conventional construction. The top of the casing 10 has an enlarged or flanged portion 11. This flange 11 is secured to a piece 12 of laminated canvas impregnated with phenol-formaldehyde resin of the Bakelite type or other suitable electrically-insulating material. The flange 11 is also secured to the brackets 13, the other ends of which are soldered to a hollow, perforated cylindrical member 14, suitably made of metal such as aluminum. The size of the member 14 is such that it completely surrounds the vessel 15 which holds the beer 16 to be warmed. Also, the lower periphery 17 of the cylinder 14 extends beyond or lower than the lower tip 18 of the casing 10, in order to prevent the casing from coming in contact with the bottom of the vessel 15 when the heater is resting thereon.

Clamped around the upper part of the casing 10 is the handle 19. That part 20 of the handle 19 near the casing 10 is of metal such as steel and that part 21 of the handle 19 which is held by the user has a non-heat-conducting exterior surface and is preferably all non-heat-conducting.

The wires 22 of the heating element pass through the casing 10, up through insulating member 12 via apertures 23 and are in electrical contact with conventional electrical terminals 24.

In operation, a conventional electrical cord having plug 25 is connected to a source of current (not shown) and to the terminals 24. The heat generated by the resistance wires 22 is transmitted to the beer through casing 10 and when the beer has been warmed sufficiently the device is removed from the vessel 15, the device being also disconnected from the source of current.

While I have described my invention in detail in its preferred embodiment it will be obvious after understanding my invention that various changes and modifications may be made therein without departing from the spirit or scope thereof. I aim in the appended claims to cover all such modifications and changes. Thus, for example, devices of different sizes to permit of their use with glasses or other open-top containers of various sizes may be employed. Variations may also be made, for example, in the size of the heating wires and casing.

I claim:

1. An immersion type heater suitable for heating liquids in open-top containers, which comprises electrical heating means having a casing, a handle attached to said casing near the upper end thereof, said handle comprising a heat-conducting portion in contact with and adjacent said casing and a non-heat-conducting portion, and a perforated, hollow cylindrical member, integrally united with said casing and handle, said cylindrical member surrounding said container when said heater is placed therein.

2. An immersion type heater suitable for heating liquids in open-top containers, which comprises electrical heating means having a casing, a handle attached to said casing near the upper end thereof, said handle comprising a heat-conducting portion in contact with and adjacent said casing and a non-heat-conducting portion, and a perforated, hollow cylindrical member, integrally united with said casing and handle, said cylindrical member extending below the lower end of said casing and surrounding said container when said heater is placed therein.

3. An immersion type heater suitable for heating liquids in open-top containers, which comprises electrical heating means, a casing and electrical terminals therefor, an insulated member between said casing and terminals, a handle attached to said casing near the upper end thereof, said handle comprising a heat-conducting portion in contact with and adjacent said casing and a non-heat-conducting portion, and a perforated, hollow cylindrical member suspended from said insulated member, said cylindrical member extending below the lower end of said casing and surrounding said container when said heater is placed therein.

4. An immersion type heater suitable for heating liquids in open-top containers, which comprises electrical heating means, a casing having a flanged top and electrical terminals for said means, an insulated member between said casing and terminals, a handle clampedly-attached to said casing just below the flanged top of said casing, said handle comprising a heat-conducting portion in contact with and adjacent said casing and a non-heat-conducting portion, brackets rigidly attached to said insulated member and flanged top at one end, and a perforated hollow cylindrical member suspended from the other ends of said brackets, said cylindrical member extending below the lower end of said casing and surrounding said container when the heater is placed therein.

CHARLES BELLUCCI.

REFERENCES CITED

The following references are of record in the file of this patent:

UNITED STATES PATENTS

| Number | Name | Date |
| --- | --- | --- |
| 1,806,004 | Tavender | May 19, 1931 |
| 2,240,953 | Kaye | May 6, 1941 |
| 2,291,367 | Bezosky | July 28, 1942 |